United States Patent
Wang

(10) Patent No.: US 9,462,408 B2
(45) Date of Patent: Oct. 4, 2016

(54) INFORMATION PROCESSING METHOD AND ELECTRONIC DEVICE

(71) Applicants: BEIJING LENOVO SOFTWARE LTD., Beijing (CN); LENOVO (BEIJING) LIMITED, Beijing (CN)

(72) Inventor: Hui Wang, Beijing (CN)

(73) Assignees: BEIJING LENOVO SOFTWARE LTD., Beijing (CN); LENOVO (BEIJING) LIMITED, Beijing (CN)

( * ) Notice: Subject to any disclaimer, the term of this patent is extended or adjusted under 35 U.S.C. 154(b) by 245 days.

(21) Appl. No.: 14/217,666

(22) Filed: Mar. 18, 2014

(65) Prior Publication Data

US 2015/0079968 A1    Mar. 19, 2015

(30) Foreign Application Priority Data

Sep. 16, 2013 (CN) .......................... 2013 1 0422390

(51) Int. Cl.
*H04W 8/18* (2009.01)
*H04W 4/00* (2009.01)
*H04W 8/20* (2009.01)
*H04W 8/24* (2009.01)

(52) U.S. Cl.
CPC ............... *H04W 4/001* (2013.01); *H04W 8/20* (2013.01); *H04W 8/24* (2013.01)

(58) Field of Classification Search
CPC .................................................... H04W 8/245
See application file for complete search history.

(56) References Cited

U.S. PATENT DOCUMENTS

| | | | | |
|---|---|---|---|---|
| 8,971,842 B2* | 3/2015 | Sadana | ................ | H04W 4/003 455/406 |
| 2009/0248737 A1* | 10/2009 | Shukla | ....................... | G06F 9/44 |
| 2012/0042036 A1* | 2/2012 | Lau | ........................... | G06F 8/61 709/217 |
| 2012/0079504 A1* | 3/2012 | Maciocci | ............ | G06F 9/44526 719/313 |
| 2012/0208461 A1* | 8/2012 | Choi | ..................... | H04W 4/008 455/41.2 |
| 2013/0035138 A1* | 2/2013 | Abbott | .................... | H04L 67/36 455/566 |
| 2013/0337808 A1* | 12/2013 | Zhao | ..................... | H04W 60/00 455/435.3 |
| 2014/0086121 A1* | 3/2014 | Emeott | .................. | H04L 67/34 370/311 |

* cited by examiner

*Primary Examiner* — Vladimir Magloire
*Assistant Examiner* — Frank Donado
(74) *Attorney, Agent, or Firm* — Kinney & Lange, P.A.

(57) ABSTRACT

The present invention discloses an information processing method. The method comprises: obtaining a control operation for the first application indicating N applications are to be installed on a second electronic device; controlling the wireless communication module to serve as a wireless Access Point (AP) having a signal coverage that covers at least the second electronic device; obtaining response information from the second electronic device and establishing a direct communication channel with the second electronic device at a radio link layer; and transmitting installation data packages associated with the N applications to the second electronic device via the communication channel. The present invention also discloses an electronic device. With the present invention, the efficiency of content transfer from an old mobile phone and a new mobile phone can be improved.

10 Claims, 6 Drawing Sheets

INFORMATION PROCESSING METHOD AND ELECTRONIC DEVICE

TECHNICAL FIELD

The present invention relates to wireless communication, and more particularly, to an information processing method and an electronic device using the same.

BACKGROUND

With development of mobile terminals (particularly smart mobile phone technology), smart mobile phones are upgraded and replaced more and more frequently. It becomes a problem for a consumer to copy contents from his/her old mobile phone to his/her new mobile phone.

Currently, there are mainly three schemes for copying contents from an old mobile phone to a new mobile phone. First, the contents in the old mobile phone can be copied to a SD card using a software application or tool in the old mobile phone and then the SD card can be inserted into the new mobile phone and the contents can be recovered to the new mobile phone. Second, the contents in the old mobile phone can be backed up or synchronized to a cloud server and then the backed up contents can be synchronized to the new mobile phone by logging in the same account using the new mobile phone. Third, the old mobile phone can be connected to a computer via a data cable and the contents in the old mobile phone can be copied to the computer; and then the new mobile phone can be connected to the computer and the backed up contents can be synchronized to the new mobile phone.

However, above three schemes have their respective problems. In particular, the first scheme is inapplicable to mobile phones having built-in SD cards. The second scheme requires a connection to the Internet and thus cannot be used when the consumer does not have such connection to the Internet. The third scheme requires accessing to a computer, which can be relatively slow. Moreover, all of the above three schemes need to copy software applications and/or information such as call records from the old mobile phone to the new mobile phone, which requires the user to perform a significant amount of operations on the new mobile phone before installing and executing the applications on the new mobile phone and using the new mobile phone in the same way as he/she uses the old phone, thereby eventually completing content transfer between the old and new mobile phones.

That is, the existing schemes for transferring contents from an old mobile phone to a new mobile phone require a large amount of user operations and cannot ensure the transfer efficiency.

SUMMARY

In light of this, it is an object of the present invention to provide an information processing method and an electronic device, capable of improving efficiency of content transfer from an old mobile phone and a new mobile phone.

In order to achieve the above object, according to a first aspect of the present invention, an information processing method is provided. The information processing method is applied in a first electronic device having a wireless communication module and having M applications installed thereon, where M≥2. The method comprises, when a first application from the M applications is in an operating state and the wireless communication module is in an operating state: obtaining a control operation for the first application indicating that N applications are to be installed on a second electronic device; controlling the wireless communication module to serve as a wireless Access Point (AP) having a signal coverage that covers at least the second electronic device; obtaining response information from the second electronic device and establishing a direct communication channel with the second electronic device at a radio link layer; and transmitting installation data packages associated with the N applications to the second electronic device via the communication channel for installing the N applications on the second electronic device, where N<M.

According to a second aspect of the present invention, an electronic device is provided. The electronic device comprises a storage module, a processing module and a wireless communication module. The storage module is configured to provide M installed applications, where M≥2. The processing module configured to, when a first application from the M applications in the storage module is in an operating state and the wireless communication module is in an operating state: obtain a control operation for the first application indicating that N applications are to be installed on a second electronic device; obtain response information from the second electronic device via the wireless communication module and control the wireless communication module to establish a communication channel; and transmit installation data packages associated with the N applications to the second electronic device via the communication channel for installing the N applications on the second electronic device, where N<M. The wireless communication module is configured to: serve, while being in the operating state, as an Access Point (AP) having a signal coverage that covers at least the second electronic device; and send the response information to the processing module and establish a direct communication channel with the second electronic device at a radio link layer under the control of the processing module.

With the information processing method and the electronic device according to the present invention, a new mobile phone can be connected with an old mobile phone directly via an AP to obtain and install all applications that have been installed on the old mobile phone. In this way, a user can obtain all information in the old mobile phone by simply clicking a link, thereby restoring the new mobile phone to a usage state consistent with that of the old mobile phone. Accordingly, it is possible to reduce manual operations, improve transfer efficiency and enhance user experience.

DETAILED DESCRIPTION OF THE EMBODIMENTS

In the following, the present invention will be further detailed with reference to the figures and embodiments.

First Embodiment

Figure 1:
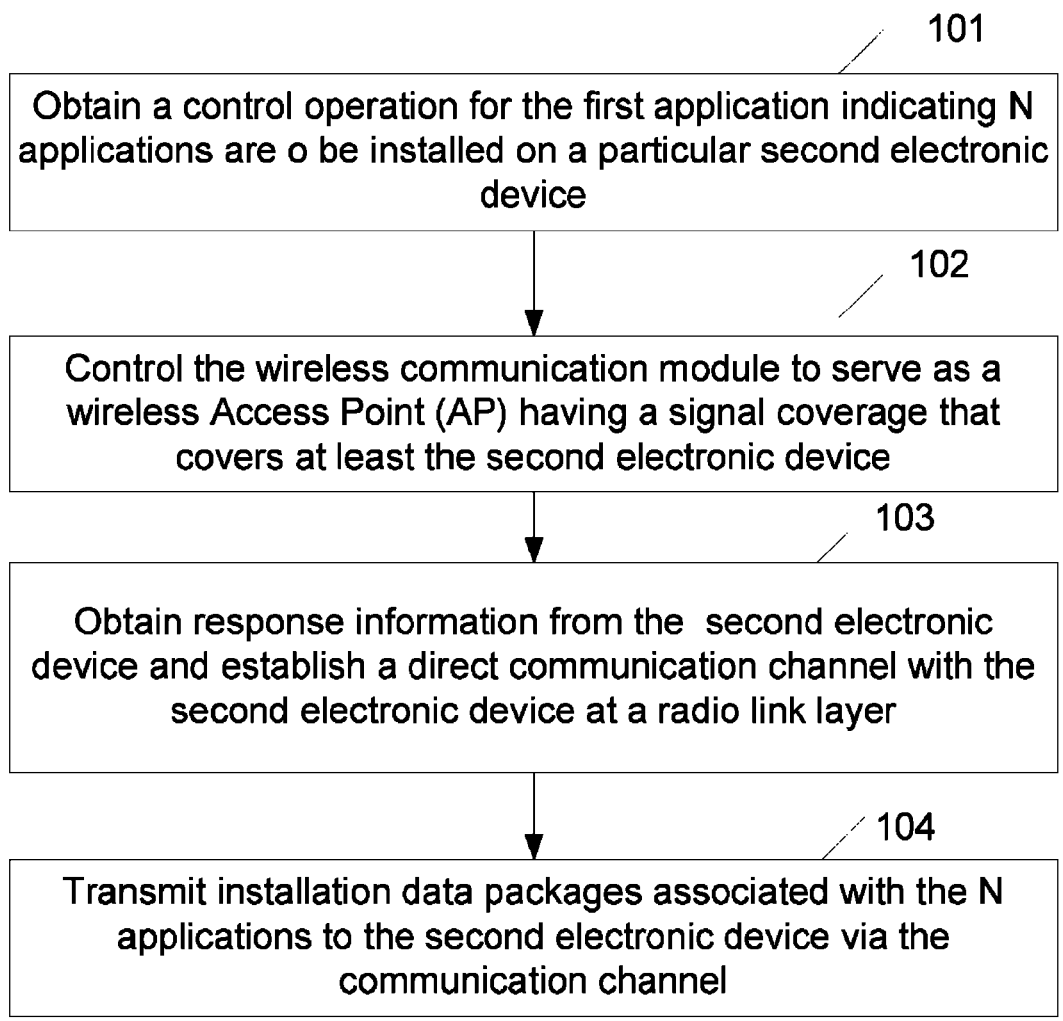
FIG. 1 is a flowchart illustrating an information processing method according to a first embodiment of the present invention.

According to this embodiment of the present invention, an information processing method is provided. The method is applied in a first electronic device having a wireless communication module and having M applications installed thereon, where M≤2. As shown in FIG. 1, when a first application from the M applications is in an operating state and the wireless communication module is in an operating state, the method includes the following steps.

At step 101, a control operation is obtained for the first application. The control operation indicates N applications are to be installed on a particular second electronic device.

At step 102, the wireless communication module is controlled to serve as a wireless Access Point (AP) having a signal coverage that covers at least the second electronic device.

At step 103, response information is obtained from the second electronic device and a direct communication channel with the second electronic device is established at a radio link layer.

At step 104, installation data packages associated with the N applications are transmitted to the second electronic device via the communication channel for installing the N applications on the second electronic device, where N<M.

Here, the step 101 can be performed before or after the step 102. The first electronic device can be an old mobile phone and the second electronic device can be a new mobile phone.

Preferably, the M applications may include at least one of a phone book, a Short Message Service (SMS), a game, a communication software application, and the like.

Preferably, the direct communication channel with the second electronic device can be established at the radio link layer using any known technique and the description thereof will be omitted here.

Preferably, the first application is a control algorithm having an identity verification identifier that enables the second electronic device to select the AP from a plurality of APs based on the identity verification identifier using a second application identical to the first application.

Here, the control algorithm having the identity verification identifier involves setting the identity verification identifier in the second application of the second electronic device or setting an identity verification identifier prefix; and selecting from identity verification identifiers corresponding to a plurality of currently detected APs an AP that matches the identity verification identifier or the identity verification identifier prefix.

Here, the identity verification identifier may be Direct-Trans-AP and the identity verification identifier prefix may be DirectTrans.

In this way, a new mobile phone can be connected with an old mobile phone directly via an AP to obtain and install all applications that have been installed on the old mobile phone. In this way, a user can obtain all information in the old mobile phone by simply clicking a link, thereby restoring the new mobile phone to a usage state consistent with that of the old mobile phone. Accordingly, it is possible to reduce manual operations, improve transfer efficiency and enhance user experience.

Second Embodiment

Figure 2:
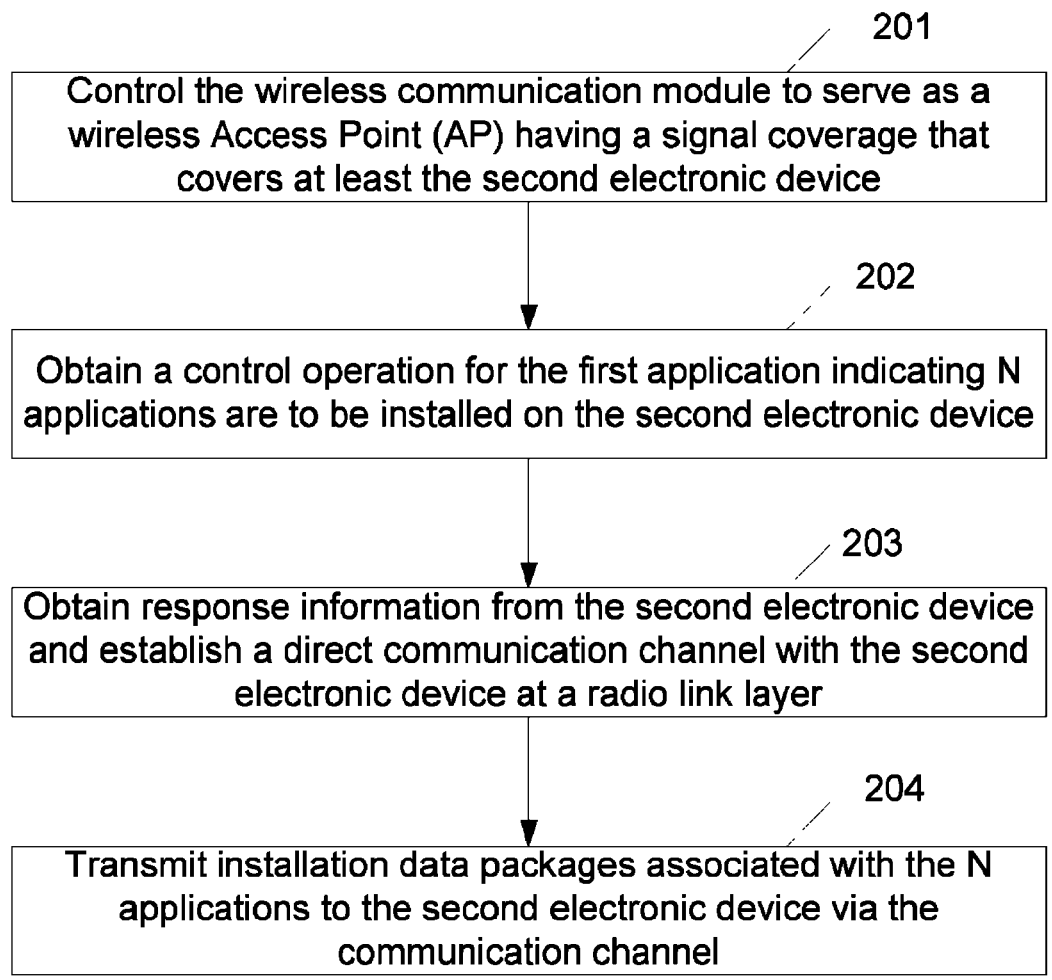
FIG. 2 is a flowchart illustrating an information processing method according to a second embodiment of the present invention.

According to this embodiment of the present invention, an information processing method is provided. The method is applied in a first electronic device having a wireless communication module and having M applications installed thereon, where M≤2. As shown in FIG. 2, when a first application from the M applications is in an operating state and the wireless communication module is in an operating state, the method includes the following steps.

At step 201, the wireless communication module is controlled to serve as a wireless Access Point (AP) having a signal coverage that covers at least the second electronic device.

At step 202, a control operation is obtained for the first application. The control operation indicates that N applications are to be installed on a second electronic device.

At step 203, response information is obtained from the second electronic device and a direct communication channel with the second electronic device is established at a radio link layer.

At step 204, installation data packages associated with the N applications are transmitted to the second electronic device via the communication channel for installing the N applications on the second electronic device, where N<M.

Here, the step 201 can be performed before or after the step 202. The first electronic device may be an old mobile phone and the second electronic device may be a new mobile phone.

Preferably, the M applications may include at least one of a phone book, a Short Message Service (SMS), a game, a communication software application, and the like.

Preferably, the direct communication channel with the second electronic device may be established at the radio link layer using any known technique and the description thereof will be omitted here.

Preferably, the first application is a control algorithm having an unique identity verification identifier that enables the second electronic device to select the AP from a plurality of APs based on the identity verification identifier using a second application identical to the first application.

Here, the control algorithm having the identity verification identifier involves setting the identity verification identifier in the second application on the second electronic device or setting an identity verification identifier prefix; and selecting from identity verification identifiers corresponding to a plurality of currently detected APs an AP that matches the identity verification identifier or the identity verification identifier prefix.

Here, the identity verification identifier may be Direct-Trans-AP and the identity verification identifier prefix may be DirectTrans.

Preferably, the step of obtaining a control operation for the first application includes obtaining a control operation on a first control element in the first application. Here the first control element can be a "click-to-transfer" option provided for the first application. For example, it can control to obtain N applications installed in the electronic device itself for installing the N applications on the second electronic device.

In this way, a new mobile phone can be connected with an old mobile phone directly via an AP to obtain and install all applications that have been installed on the old mobile phone. In this way, a user can obtain all information in the old mobile phone by simply clicking a link, thereby restoring the new mobile phone to a usage state consistent with that of the old mobile phone. Accordingly, it is possible to reduce manual operations, improve transfer efficiency and enhance user experience.

Third Embodiment

Figure 3:
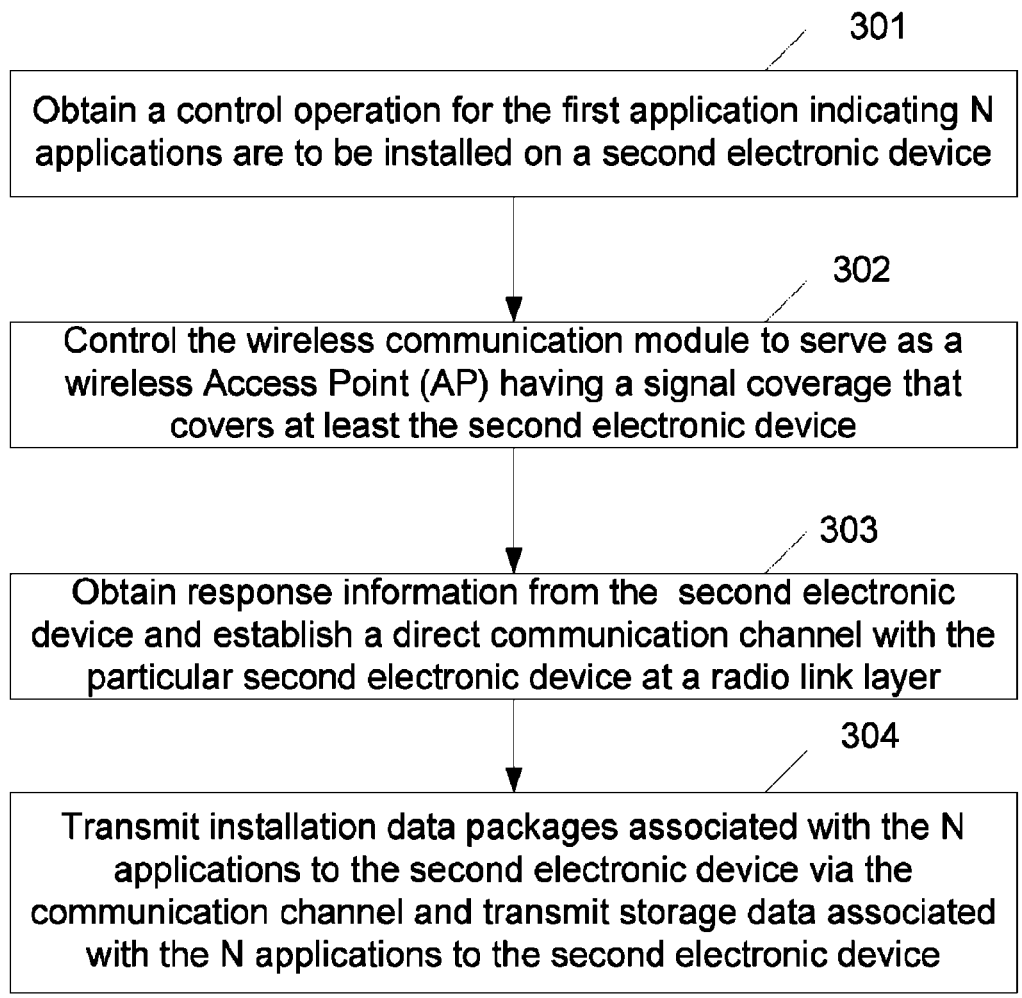
FIG. 3 is a flowchart illustrating an information processing method according to a third embodiment of the present invention.

According to this embodiment of the present invention, an information processing method is provided. The method is applied in a first electronic device having a wireless communication module and having M applications installed thereon, where M≤2. As shown in FIG. 3, when a first application from the M applications is in an operating state and the wireless communication module is in an operating state, the method includes the following steps.

At step 301, a control operation is obtained for the first application. The control operation indicates N applications are to be installed on a particular second electronic device.

At step 302, the wireless communication module is controlled to serve as a wireless Access Point (AP) having a signal coverage that covers at least the second electronic device.

At step 303, response information is obtained from the second electronic device and a direct communication channel with the second electronic device is established at a radio link layer.

At step 304, installation data packages associated with the N applications are transmitted to the second electronic device via the communication channel for installing the N applications on the second electronic device, where N<M. In addition, storage data associated with the N applications are transmitted to the second electronic device via the communication channel for associating with the N applications after they are installed on the second electronic device, so as to enable the N applications to respond to an input operation Here, the step 301 can be performed before or after the step 302. The first electronic device can be an old mobile phone and the second electronic device can be a new mobile phone.

Preferably, the M applications may include at least one of a phone book, a Short Message Service (SMS), a game, a communication software application, and the like.

Preferably, the direct communication channel with the second electronic device may be established at the radio link layer using any known technique and the description thereof will be omitted here.

Preferably, the storage data associated with the N applications may include at least one of record data, call history, SMS record and system configuration data associated with the applications.

Preferably, the N applications can be all of the applications of the first electronic device. Alternatively, a second software information list may be created, which includes all of the applications and the record data, call history, SMS record and system configuration data associated with each of the applications as stored in the first electronic device itself. The applications and/or the record data, call history, SMS record and/or system configuration data associated with each of the applications may be selected from the second software information list.

Preferably, the first application is a control algorithm having an unique identity verification identifier that enables the second electronic device to select the AP from a plurality of APs based on the identity verification identifier using a second application identical to the first application. Here, the control algorithm having the identity verification identifier involves setting the identity verification identifier in the second application of the second electronic device or setting an unique identity verification identifier prefix; and selecting from identity verification identifiers corresponding to a plurality of currently detected APs an AP that matches the identity verification identifier or the identity verification identifier prefix.

Here, the identity verification identifier may be DirectTrans-AP and the identity verification identifier prefix may be DirectTrans.

Preferably, the step of obtaining a control operation for the first application includes obtaining a control operation on a first control element in the first application.

In this way, a new mobile phone can be connected with an old mobile phone directly via an AP to obtain and install all applications that have been installed on the old mobile phone as well as the record data, call history, SMS record and/or system configuration data associated with each of the applications. In this way, a user can obtain all information in the old mobile phone by simply clicking a link, thereby restoring the new mobile phone to a usage state consistent with that of the old mobile phone. Accordingly, it is possible to reduce manual operations, improve transfer efficiency and enhance user experience.

Fourth Embodiment

Figure 4:
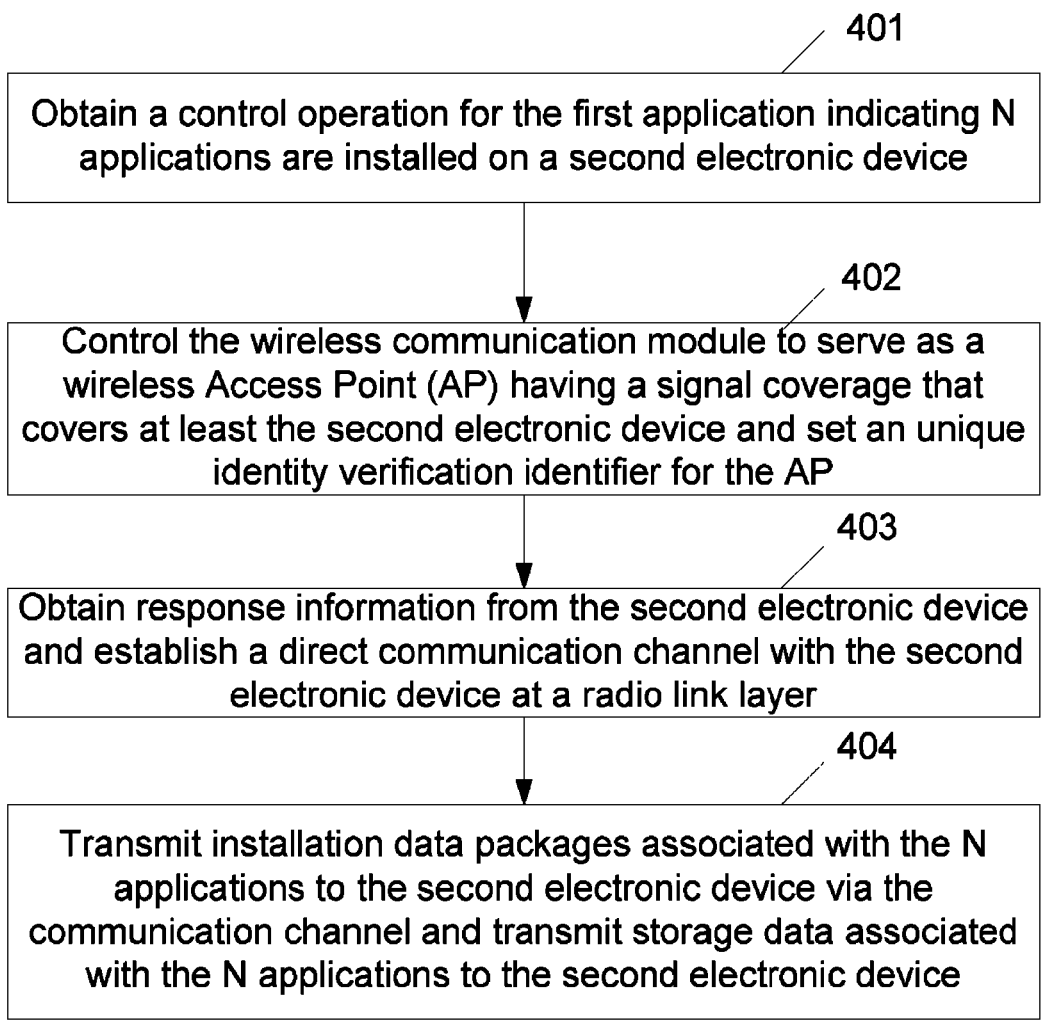
FIG. 4 is a flowchart illustrating an information processing method according to a fourth embodiment of the present invention.

According to this embodiment of the present invention, an information processing method is provided. The method is applied in a first electronic device having a wireless communication module and having M applications installed thereon, where M≤2. As shown in FIG. 4, when a first application from the M applications is in an operating state and the wireless communication module is in an operating state, the method includes the following steps.

At step 401, a control operation is obtained for the first application. The control operation indicates N applications are to be installed on a particular second electronic device.

At step 402, the wireless communication module is controlled to serve as a wireless Access Point (AP) having a signal coverage that covers at least the second electronic device. In addition, an unique identity verification identifier is set for the AP.

At step 403, response information is obtained from the second electronic device and a direct communication channel with the second electronic device is established at a radio link layer.

At step 404, installation data packages associated with the N applications are transmitted to the second electronic device via the communication channel for installing the N applications on the second electronic device, where N<M. In addition, storage data associated with the N applications are transmitted to the second electronic device via the communication channel for associating with the N applications after installing the on the second electronic device, so as to enable the N applications to respond to an input operation Here, the step 401 can be performed before or after the step 402. The first electronic device can be an old mobile phone and the second electronic device can be a new mobile phone.

Preferably, the M applications may include at least one of a phone book, a Short Message Service (SMS), a game, a communication software application, and the like.

Preferably, the direct communication channel with the second electronic device can be established at the radio link layer using any known technique and the description thereof will be omitted here.

The identity verification identifier enables the second electronic device, on which a second application identical to the first application has been installed and is in an operating state, to uniquely identify the AP when using a second wireless communication module in an operating state to scan for an AP. In addition, a password can be set for the identity verification identifier to ensure the confidentiality of information transferred between the old and new mobile phones.

Preferably, the storage data associated with the N applications may include at least one of record data, call history, SMS record and system configuration data associated with the applications.

Preferably, the N applications may be all of the applications of the first electronic device. Alternatively, a second software information list may be created, which includes all of the applications and the record data, call history, SMS record and system configuration data associated with each of the applications as stored in the first electronic device itself. The applications and/or the record data, call history, SMS record and/or system configuration data associated with each of the applications may be selected from the second software information list.

Preferably, the first application is a control algorithm having an unique identity verification identifier that enables the second electronic device to select the AP from a plurality of APs based on the identity verification identifier using a second application identical to the first application.

Here, the control algorithm having the identity verification identifier involves setting the identity verification identifier in the second application of the second electronic device or setting an unique identity verification identifier prefix; and selecting from identity verification identifiers corresponding to a plurality of currently detected APs an AP that matches the identity verification identifier or the identity verification identifier prefix.

Here, the identity verification identifier can be Direct-Trans-AP and the identity verification identifier prefix can be DirectTrans.

Preferably, the step of obtaining a control operation for the first application includes obtaining a control operation on a first control element in the first application.

In this way, a new mobile phone can be connected with an old mobile phone directly via an AP to obtain and install all applications that have been installed on the old mobile phone as well as the record data, call history, SMS record and/or system configuration data associated with each of the applications. In this way, a user can obtain all information in the old mobile phone by simply clicking a link, thereby restoring the new mobile phone to a usage state consistent with that of the old mobile phone. Accordingly, it is possible to reduce manual operations, improve transfer efficiency and enhance user experience.

Fifth Embodiment

Figure 5:
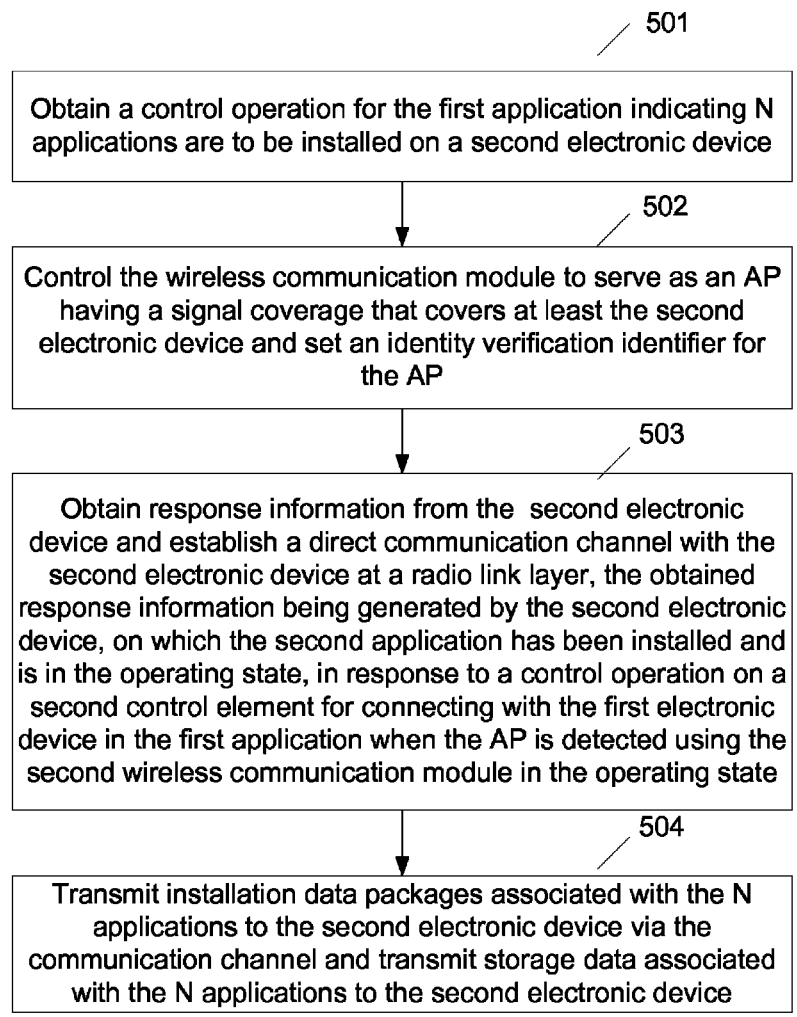
FIG. 5 is a flowchart illustrating an information processing method according to a fifth embodiment of the present invention.
Figure 6:
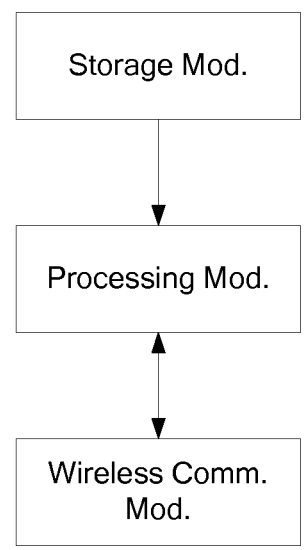
FIG. 6 is a schematic diagram showing a structure of an electronic device according to an embodiment of the present invention.

According to this embodiment of the present invention, an information processing method is provided. The method is applied in a first electronic device having a wireless communication module and having M applications installed thereon, where M≤2. As shown in FIG. 5, when a first application from the M applications is in an operating state and the wireless communication module is in an operating state, the method includes the following steps.

At step 501, a control operation is obtained for the first application. The control operation indicates N applications are to be installed on a particular second electronic device.

At step 502, the wireless communication module is controlled to serve as a wireless Access Point (AP) having a signal coverage that covers at least the second electronic device. In addition, an unique identity verification identifier is set for the AP.

At step 503, response information is obtained from the second electronic device and a direct communication channel with the second electronic device is established at a radio link layer. Here the response information is generated by the second electronic device, on which the second application has been installed and is in the operating state, in response to a control operation on a second control element for connecting with the first electronic device in the first application when the AP is detected using the second wireless communication module in the operating state.

At step 504, installation data packages associated with the N applications are transmitted to the second electronic device via the communication channel for installing the N applications on the second electronic device, where N<M. In addition, storage data associated with the N applications are transmitted to the second electronic device via the communication channel for associating with the N applications after they are installed on the second electronic device, so as to enable the N applications to respond to an input operation Here, the step 501 can be performed before or after the step 502. The first electronic device can be an old mobile phone and the second electronic device can be a new mobile phone.

Preferably, the first application is a control algorithm having an unique identity verification identifier that enables the second electronic device to select the AP from a plurality of APs based on the identity verification identifier using a second application identical to the first application.

Here, the control algorithm having the identity verification identifier involves setting the identity verification identifier in the second application of the second electronic device or setting an unique identity verification identifier prefix; and selecting from identity verification identifiers corresponding to a plurality of currently detected APs an AP that matches the identity verification identifier or the identity verification identifier prefix.

Here, the identity verification identifier may be Direct-Trans-AP and the identity verification identifier prefix may be DirectTrans.

Preferably, the step of obtaining a control operation for the first application includes obtaining a control operation on a first control element in the first application. Here the first control element can be a "click-to-transfer" option provided for the first application. For example, it can control to obtain N applications installed in the electronic device itself for installing the N applications on the particular second electronic device.

Preferably, the M applications may include at least one of a phone book, a Short Message Service (SMS), a game, a communication software application, and the like.

Preferably, the direct communication channel with the second electronic device may be established at the radio link layer using any known technique and the description thereof will be omitted here.

The identity verification identifier enables the second electronic device, on which a second application identical to the first application has been installed and is in an operating state, to uniquely identify the AP when using a second wireless to communication module in an operating state to scan for an AP. In addition, a password can be set for the identity verification identifier to ensure the confidentiality of information transferred between the old and new mobile phones.

Preferably, the storage data associated with the N applications may include at least one of record data, call history, SMS record and system configuration data associated with the applications.

Preferably, the N applications can be all of the applications of the first electronic device. Alternatively, a second software information list can be created, which includes all of the applications and the record data, call history, SMS record and system configuration data associated with each of the applications as stored in the first electronic device itself. The applications and/or the record data, call history, SMS record and/or system configuration data associated with each of the applications can be selected from the second software information list.

Preferably, the second control element for connecting with the first electronic device in the first application is used by the second electronic device for notifying the first electronic device to treat the second electronic device as a target terminal, i.e., notifying the first electronic device that the second electronic device is a new mobile phone and that the first electronic device is required to transmit to the second electronic device the N applications obtained by the first application based on touch information associated with the first control element.

In this way, a new mobile phone can be connected with an old mobile phone directly via an AP to obtain and install all applications that have been installed on the old mobile phone as well as the record data, call history, SMS record and/or system configuration data associated with each of the applications. In this way, a user can obtain all information in the old mobile phone by simply clicking a link, thereby restoring the new mobile phone to a usage state consistent with that of the old mobile phone. Accordingly, it is possible to reduce manual operations, improve transfer efficiency and enhance user experience.

Sixth Embodiment

According to this embodiment of the present invention, an electronic device is provided. The electronic device comprises a storage module, a processing module and a wireless communication module.

The storage module is configured to provide M installed applications, where M≥2.

The processing module configured to, when a first application from the M applications in the storage module is in an operating state and the wireless communication module is in an operating state: obtain a control operation for the first application indicating N applications are to be installed on a second electronic device; obtain response information from the second electronic device via the wireless communication module and control the wireless communication module to establish a communication channel; and transmit installation data packages associated with the N applications to the second electronic device via the communication channel for installing the N applications on the second electronic device, where N<M.

The wireless communication module is configured to: serve, while being in the operating state, as an Access Point (AP) having a signal coverage that covers at least the second electronic device; and send the response information to the processing module and establish a direct communication channel with the second electronic device at a radio link layer under the control of the processing module.

Preferably, the M applications may include a phone book, a Short Message Service (SMS), a game, a communication software application, and the like.

Preferably, the direct communication channel with the second electronic device can be established at the radio link layer using any known technique and the description thereof will be omitted here.

Preferably, the first application is a control algorithm having an unique identity verification identifier that enables the second electronic device to select the AP from a plurality of APs based on the identity verification identifier using a second application identical to the first application.

Here, the control algorithm having the identity verification identifier involves setting the identity verification identifier in the second application of the second electronic device or setting an unique identity verification identifier prefix; and selecting from identity verification identifiers corresponding to a plurality of currently detected APs an AP that matches the identity verification identifier or the identity verification identifier prefix.

Here, the identity verification identifier may be Direct-Trans-AP and the identity verification identifier prefix may be DirectTrans.

In this way, a new mobile phone can be connected with an old mobile phone directly via an AP to obtain and install all applications that have been installed on the old mobile phone. In this way, a user can obtain all information in the old mobile phone by simply clicking a link, thereby restoring the new mobile phone to a usage state consistent with that of the old mobile phone. Accordingly, it is possible to reduce manual operations, improve transfer efficiency and enhance user experience.

Seventh Embodiment

According to this embodiment of the present invention, an electronic device is provided. The electronic device comprises a storage module, a processing module and a wireless communication module.

The storage module is configured to provide M installed applications, where M≤2.

The processing module configured to, when a first application from the M applications in the storage module is in an operating state and the wireless communication module is in an operating state: obtain a control operation for the first application indicating N applications are to be installed on a second electronic device; obtain response information from the second electronic device via the wireless communication module and control the wireless communication module to establish a communication channel; and transmit installation data packages associated with the N applications to the second electronic device via the communication channel for installing the N applications on the second electronic device, where N<M.

The wireless communication module is configured to: serve, while being in the operating state, as an Access Point (AP) having a signal coverage that covers at least the second electronic device; and send the response information to the processing module and establish a direct communication channel with the second electronic device at a radio link layer under the control of the processing module.

Preferably, the M applications may include at least one of a phone book, a Short Message Service (SMS), a game, a communication software application, and the like.

Preferably, the direct communication channel with the second electronic device can be established at the radio link layer using any known technique and the description thereof will be omitted here.

Preferably, the processing module is further configured to: transmit storage data associated with the N applications to the second electronic device via the communication channel provided by the wireless communication channel for associating with the N applications after they are installed on the second electronic device, so as to enable the N applications to respond to an input operation.

Preferably, the storage data associated with the N applications may include record data, call history, SMS record and system configuration data associated with the applications.

The N applications can be all of the applications of the first electronic device. Alternatively, a second software information list can be created, which includes all of the applications and the record data, call history, SMS record and system configuration data associated with each of the applications as stored in the first electronic device itself. The applications and/or the record data, call history, SMS record and/or system configuration data associated with each of the applications can be selected from the second software information list.

Preferably, the first application is a control algorithm having an unique identity verification identifier that enables the second electronic device to select the AP from a plurality of APs based on the identity verification identifier using a second application identical to the first application.

Here, the control algorithm having the identity verification identifier involves setting the identity verification identifier in the second application of the second electronic device or setting an unique identity verification identifier prefix; and selecting from identity verification identifiers corresponding to a plurality of currently detected APs an AP that matches the identity verification identifier or the identity verification identifier prefix.

Here, the identity verification identifier may be Direct-Trans-AP and the identity verification identifier prefix may be DirectTrans.

Preferably, the operation of obtaining a control operation for the first application includes obtaining a control operation on a first control element in the first application. Here the first control element can be a "click-to-transfer" option provided for the first application. For example, it can control to obtain N applications installed in the electronic device itself for installing the N applications on the second electronic device.

In this way, a new mobile phone can be connected with an old mobile phone directly via an AP to obtain and install all applications that have been installed on the old mobile phone as well as the record data, call history, SMS record and/or system configuration data associated with each of the applications. In this way, a user can obtain all information in the old mobile phone by simply clicking a link, thereby restoring the new mobile phone to a usage state consistent with that of the old mobile phone. Accordingly, it is possible to reduce manual operations, improve transfer efficiency and enhance user experience.

Eighth Embodiment

According to this embodiment of the present invention, an electronic device is provided. The electronic device comprises a storage module, a processing module and a wireless communication module.

The storage module is configured to provide M installed applications, where M≥2.

The processing module configured to, when a first application from the M applications in the storage module is in an operating state and the wireless communication module is in an operating state: obtain a control operation for the first application indicating N applications are to be installed on a second electronic device; obtain response information from the second electronic device via the wireless communication module and control the wireless communication module to establish a communication channel; and transmit installation data packages associated with the N applications to the second electronic device via the communication channel for installing the N applications on the second electronic device, where N<M.

The wireless communication module is configured to: serve, while being in the operating state, as an Access Point (AP) having a signal coverage that covers at least the second electronic device; and send the response information to the processing module and establish a direct communication channel with the second electronic device at a radio link layer under the control of the processing module.

Preferably, the M applications may include at least one of a phone book, a Short Message Service (SMS), a game, a communication software application, and the like.

Preferably, the direct communication channel with the second electronic device can be established at the radio link layer using any known technique and the description thereof will be omitted here.

The processing module is further configured to: transmit storage data associated with the N applications to the second electronic device via the communication channel provided by the wireless communication channel for to associating with the N applications after they are installed on the second electronic device, so as to enable the N applications to respond to an input operation.

Preferably, the storage data associated with the N applications may include at least one of record data, call history, SMS record and system configuration data associated with the applications.

The N applications can be all of the applications of the first electronic device. Alternatively, a second software information list can be created, which includes all of the applications and the record data, call history, SMS record and system configuration data associated with each of the applications as stored in the first electronic device itself. The applications and/or the record data, call history, SMS record and/or system configuration data associated with each of the applications can be selected from the second software information list.

The wireless communication module is capable of configuring itself as an AP and setting an unique identity verification identifier for the AP. Here, the identity verification identifier enables the second electronic device, on which a second application identical to the first application has been installed and is in an operating state, to uniquely identify the AP when using a second wireless communication module in an operating state to scan for an AP. Here, the control algorithm having the identity verification identifier involves setting the identity verification identifier in the second application of the second electronic device or setting an unique identity verification identifier prefix; and selecting from identity verification identifiers corresponding to a plurality of currently detected APs an AP that matches the identity verification identifier or the identity verification identifier prefix.

Here, the identity verification identifier may be Direct-Trans-AP and the identity verification identifier prefix may be DirectTrans.

In addition, a password can be set for the identity verification identifier to ensure the confidentiality of information transferred between the old and new mobile phones.

Preferably, the second control element for connecting with the first electronic device in the first application is used by the second electronic device for notifying the first electronic device to treat the second electronic device as a target terminal, i.e., notifying the first electronic device that the second electronic device is a new mobile phone and that the first electronic device is required to transmit to the second electronic device the N applications obtained by the first application based on touch information associated with the first control element.

In this way, a new mobile phone can be connected with an old mobile phone directly via an AP to obtain and install all applications that have been installed on the old mobile phone as well as the record data, call history, SMS record and/or system configuration data associated with each of the applications. In this way, a user can obtain all information in the old mobile phone by simply clicking a link, thereby restoring the new mobile phone to a usage state consistent with that of the old mobile phone. Accordingly, it is possible to reduce manual operations, improve transfer efficiency and enhance user experience.

Ninth Embodiment

According to this embodiment of the present invention, an electronic device is provided. The electronic device comprises a storage module, a processing module and a wireless communication module.

The storage module is configured to provide M installed applications, where M≤2.

The processing module configured to, when a first application from the M applications in the storage module is in an operating state and the wireless communication module is in an operating state: obtain a control operation for the first application indicating N applications are to be installed on a second electronic device; obtain response information from the second electronic device via the wireless communication module and control the wireless communication module to establish a communication channel; and transmit installation data packages associated with the N applications to the second electronic device via the communication channel for installing the N applications on the second electronic device, where N<M.

The wireless communication module is configured to: serve, while being in the operating state, as an Access Point (AP) having a signal coverage that covers at least the second electronic device; and send the response information to the processing module and establish a direct communication channel with the second electronic device at a radio link layer under the control of the processing module.

Preferably, the M applications may include at least one of a phone book, a Short Message Service (SMS), a game, a communication software application, and the like.

Preferably, the direct communication channel with the second electronic device can be established at the radio link layer using any known technique and the description thereof will be omitted here.

The processing module is further configured to: transmit storage data associated with the N applications to the second electronic device via the communication channel provided by the wireless communication channel for associating with the N applications after they are installed on the second electronic device, so as to enable the N applications to respond to an input operation.

Preferably, the storage data associated with the N applications may include at least one of record data, call history, SMS record and system configuration data associated with the applications.

The N applications can be all of the applications of the first electronic device. Alternatively, a second software information list can be created, which includes all of the applications and the record data, call history, SMS record and system configuration data associated with each of the applications as stored in the first electronic device itself. The applications and/or the record data, call history, SMS record and/or system configuration data associated with each of the applications can be selected from the second software information list.

The wireless communication module is capable of configuring itself as an AP and setting an unique identity verification identifier for the AP. Here, the identity verification identifier enables the second electronic device, on which a second application identical to the first application has been installed and is in an operating state, to uniquely identify the AP when using a second wireless communication module in an operating state to scan for an AP. In addition, a password can be set for the identity verification identifier to ensure the confidentiality of information transferred between the old and new mobile phones. Here, the control algorithm having the identity verification identifier involves setting the identity verification identifier in the second application of the second electronic device or setting an unique identity verification identifier prefix; and selecting from identity verification identifiers corresponding to a plurality of currently detected APs an AP that matches the identity verification identifier or the identity verification identifier prefix.

Here, the identity verification identifier may be Direct-Trans-AP and the identity verification identifier prefix may be DirectTrans.

The response information obtained by the processing module is generated by the second electronic device, on which the second application has been installed and is in the operating state, in response to a control operation on a second control element for connecting with the first electronic device in the first application when the AP is detected using the second wireless communication module in the operating state. Preferably, the second control element for connecting with the first electronic device in the first application is used by the second electronic device for notifying the first electronic device to treat the second electronic device as a target terminal, i.e., notifying the first electronic device that the second electronic device is a new mobile phone and that the first electronic device is required to transmit to the second electronic device the N applications obtained by the first application based on touch information associated with the first control element.

In particular, the storage module is configured to provide a first application. Here, the first application is a control algorithm having an unique identity verification identifier that enables the second electronic device to select the AP from a plurality of APs based on the identity verification identifier using a second application identical to the first application.

The processing module is configured to obtain, as the control operation obtained for the first application, a control operation on a first control element in the first application.

In this way, a new mobile phone can be connected with an old mobile phone directly via an AP to obtain and install all applications that have been installed on the old mobile phone as well as the record data, call history, SMS record and/or system configuration data associated with each of the applications. In this way, a user can obtain all information in the old mobile phone by simply clicking a link, thereby restoring the new mobile phone to a usage state consistent with that of the old mobile phone. Accordingly, it is possible to reduce manual operations, improve transfer efficiency and enhance user experience.

It can be appreciated from the embodiments of the present application that the disclosed device and method can be implemented in alternative ways. The device embodiments as described above are illustrative only. For example, while the units have been divided in accordance with their logical functions, other divisions are possible in practice. For example, more than one unit or element can be combined or can be integrated into another system, or some features can be ignored or omitted. In addition, the coupling, direct coupling or communicative connection between various components as shown or discussed can be an indirect coupling or communicative connection via some interface, device or unit and can be electrical, mechanical or in another form.

The units described above as separated may or may not be physically separated. The components shown as units may or may not be physical units. They can be co-located or can be distributed over a number of network elements. Depending on actual requirements, some or all of the units can be selected to achieve the object of the present invention.

Further, all the functional units in various embodiments of the present invention can be integrated within one processing unit, or each of these units can be a separate unit, or two or more units can be integrated into one unit. Such integrated unit can be implemented in hardware, possibly in combination with software functional units.

It can be appreciated by those skilled in the art that some or all of the steps in the method embodiment as described above can be implemented by hardware following instructions of a program. Such program can be stored in a computer readable storage medium and, when executed, performs the steps of the above method embodiment. The storage medium may be any of various mediums capable of storing program codes, such as a mobile storage device, a Read Only Memory (ROM), a Random Access Memory (RAM), a magnetic disk or an optical disc.

While the embodiments of the present invention have been described above, the scope of the present invention is not limited thereto. Various modifications and alternatives can be made by those skilled in the art without departing from the scope of the present disclosure. These modifications and alternatives are to be encompassed by the scope of the present invention which is only defined by the claims as attached.

What is claimed is:

1. An information processing method in a first electronic device having a wireless communication module and having M applications installed thereon, where $M \geq 2$, the method comprising, when a first application of the M applications is in an operating state:
   obtaining a control operation for the first application indicating N applications are to be installed on a second electronic device;
   controlling the wireless communication module to serve as a wireless Access Point (AP) having a signal coverage that covers at least the second electronic device;
   establishing a direct communication channel with the second electronic device at a radio link layer in response to information from the second electronic device;
   configuring the wireless communication module as an AP and setting an identity verification identifier for the AP, wherein the identity verification identifier enables the second electronic device, on which a second application identical to the first application has been installed and is in an operating state, to uniquely identify and select the AP when using a second wireless communication module in an operating state to scan for an AP; and
   transmitting, based on the AP selection, installation data packages associated with the N applications to the second electronic device via the direct communication channel for installing the N applications on the second electronic device, where $N < M$.

2. The method of claim 1, wherein the first application is a control algorithm having an identity verification identifier that enables the second electronic device to select the AP from a plurality of APs based on the identity verification identifier using the second application identical to the first application.

3. The method of claim 2, wherein said obtaining of a control operation for the first application comprises:
   obtaining a control operation on a first control element in the first application.

4. The method of claim 3, further comprising:
   transmitting storage data associated with the N applications to the second electronic device via the communication channel for associating with the N applications after installing the N applications on the second electronic device, so as to enable the N applications to respond to an input operation.

5. The method of claim 1, wherein the obtained response information is generated by the second electronic device, on which the second application has been installed and is in the operating state, in response to a control operation on a second control element for connecting with the first electronic device in the first application when the AP is detected using the second wireless communication module in the operating state.

6. An electronic device, comprising a storage module, a processing module and a wireless communication module, wherein
   the storage module is configured to provide M installed applications, where $M \geq 2$;
   the processing module is configured to, when a first application of the M applications in the storage module is in an operating state:
     obtain a control operation for the first application indicating N applications are to be installed on a second electronic device;
     obtain response information from the second electronic device via the wireless communication module and control the wireless communication module to establish a communication channel; and
     transmit installation data packages associated with the N applications to the second electronic device via the communication channel for installing the N applications on the second electronic device, where $N < M$, and
   the wireless communication module is configured to:
     serve, while being in the operating state, as an Access Point (AP) having a signal coverage that covers at least the second electronic device; and send the response information to the processing module and establish a direct communication channel with the second electronic device at a radio link layer under the control of the processing module;

wherein the wireless communication module is capable of configuring itself as an AP and setting an identity verification identifier for the AP, wherein the identity verification identifier enables the second electronic device, on which a second application identical to the first application has been installed and is in an operating state, to uniquely identify the AP when using a second wireless communication module in an operating state to scan for an AP.

7. The electronic device of claim 6, wherein the first application is a control algorithm having an identity verification identifier that enables the second application identical to the first application to select the AP from a plurality of APs based on the identity verification identifier.

8. The electronic device of claim 7, wherein the processing module is configured to: obtain, as the control operation obtained for the first application, a control operation on a first control element in the first application.

9. The electronic device of claim 8, wherein the processing module is further configured to:
transmit storage data associated with the N applications to the second electronic device via the communication channel provided by the wireless communication channel for associating with the N applications after they are installed on the second electronic device, so as to enable the N applications to respond to an input operation.

10. The electronic device of claim 6, wherein the response information obtained by the processing module is generated by the second electronic device, on which the second application has been installed and is in the operating state, in response to a control operation on a second control element for connecting with the first electronic device in the first application when the AP is detected using the second wireless communication module in the operating state.

* * * * *